United States Patent [19]

Kato et al.

[11] Patent Number: 5,553,775
[45] Date of Patent: Sep. 10, 1996

[54] AIR CONDITIONER SYSTEM FOR VEHICLE

[75] Inventors: Keno Kato; Ikutaro Noji, both of Yokohama; Masashi Arai; Makoto Fukubayashi, both of Isehara, all of Japan

[73] Assignee: Nissan Motor Co., Ltd., Yokohama, Japan

[21] Appl. No.: 346,170

[22] Filed: Nov. 22, 1994

[30] Foreign Application Priority Data

Nov. 25, 1993 [JP] Japan .................. 5-295593

[51] Int. Cl.$^6$ .................. B61D 27/00; F24F 7/00
[52] U.S. Cl. .................. 236/49.3; 236/91 C; 454/75
[58] Field of Search .................. 236/91 C, 49.3; 454/75, 91, 152; 165/43

[56] References Cited

U.S. PATENT DOCUMENTS

| | | | |
|---|---|---|---|
| 4,938,033 | 7/1990 | Ogihara et al. | |
| 4,949,624 | 8/1990 | Hara et al. | 236/91 C X |
| 5,078,316 | 1/1992 | Hara et al. | 62/244 |
| 5,086,628 | 2/1992 | Hashimoto | 236/49.3 |
| 5,181,654 | 1/1993 | Yoshimi et al. | 236/91 C |

FOREIGN PATENT DOCUMENTS 136812  5/1989  Japan .................. 236/91 C

*Primary Examiner*—William E. Wayner
*Attorney, Agent, or Firm*—Lowe, Price, LeBlanc & Becker

[57] ABSTRACT

An air conditioner system for a vehicle having an occupant compartment which includes a driver's occupying area and a front passenger's occupying area. The system includes a vent duct adapted to conduct a conditioned air. The vent duct defines a first passages opening to the driver's occupying area and a second passage opening to the front passenger's occupying area. First and second vent valves are disposed within the first and second passages, respectively. First and second actuators are drivingly connected to the first and second vent valves. A first sensor is so constructed and arranged as to detect insolation magnitude within the driver's occupying area and generate a first sensor signal indicative of the detected insolation magnitude within the driver's occupying area. A second sensor is so constructed and arranged as to detect insolation magnitude within the front passenger's occupying area and generate a second sensor signal indicative of said detected insolation magnitude within the front passenger's occupying area. A control unit is provided to determine target degrees of opening which the first and second vent valves are to take in response to the first and second sensor signals and providing first and second outputs to the first and second actuators, respectively, to set the first and second vent valves at the determined target degrees of opening.

2 Claims, 5 Drawing Sheets

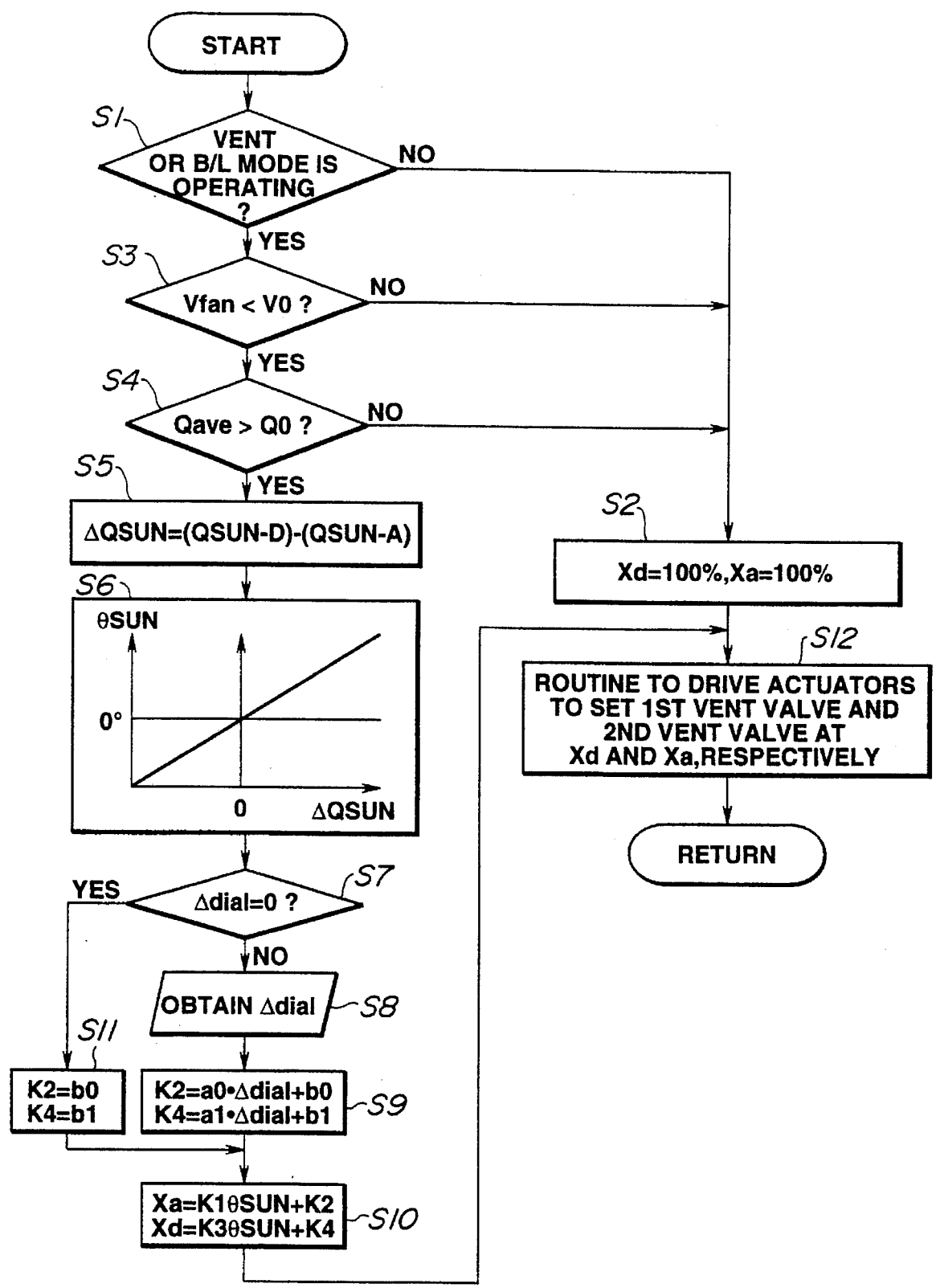

AIR CONDITIONER SYSTEM FOR VEHICLE

BACKGROUND OF THE INVENTION

The present invention relates to an air conditioner system for a vehicle.

Various attempts have been made to improve performance of an air conditioner system.

An object of the present invention is to improve a control strategy of an air conditioner system such that a driver's occupying area and a front passenger's occupying area of an occupant compartment of a vehicle are conditioned separately.

SUMMARY OF THE INVENTION

According to one aspect of the present invention, there is provided in an air conditioner system for a vehicle having an occupant compartment which includes a driver's occupying area and a front passenger's occupying area:

- a duct adapted to conduct a conditioned air, the duct defining a first passage opening to the driver's occupying area and a second passage opening to the front passenger's occupying area;
- a first vent valve disposed within the first passage;
- a second vent valve disposed within the second passage;
- a first actuator drivingly connected to the first vent valve;
- a second actuator drivingly connected to the second vent valve;
- a first sensor so constructed and arranged as to detect insolation magnitude within the driver's occupying area and generate a first sensor signal indicative of the detected insolation magnitude within the driver's occupying area;
- a second sensor so constructed and arranged as to detect insolation magnitude within the front passenger's occupying area and generate a second sensor signal indicative of the detected insolation magnitude within the front passenger's occupying area; and
- means for determining target degrees of opening which the first and second vent valves are to take in response to the first and second sensor signals and providing first and second outputs to the first and second actuators, respectively, to set the first and second vent valves at the determined target degrees of opening, respectively.

BRIEF DESCRIPTION OF THE DRAWINGS

FIG. 8 is a flow diagram illustrating job procedure in the vent valve control operation of the air conditioner system.

DESCRIPTION OF THE PREFERRED EMBODIMENT

Figure 1:
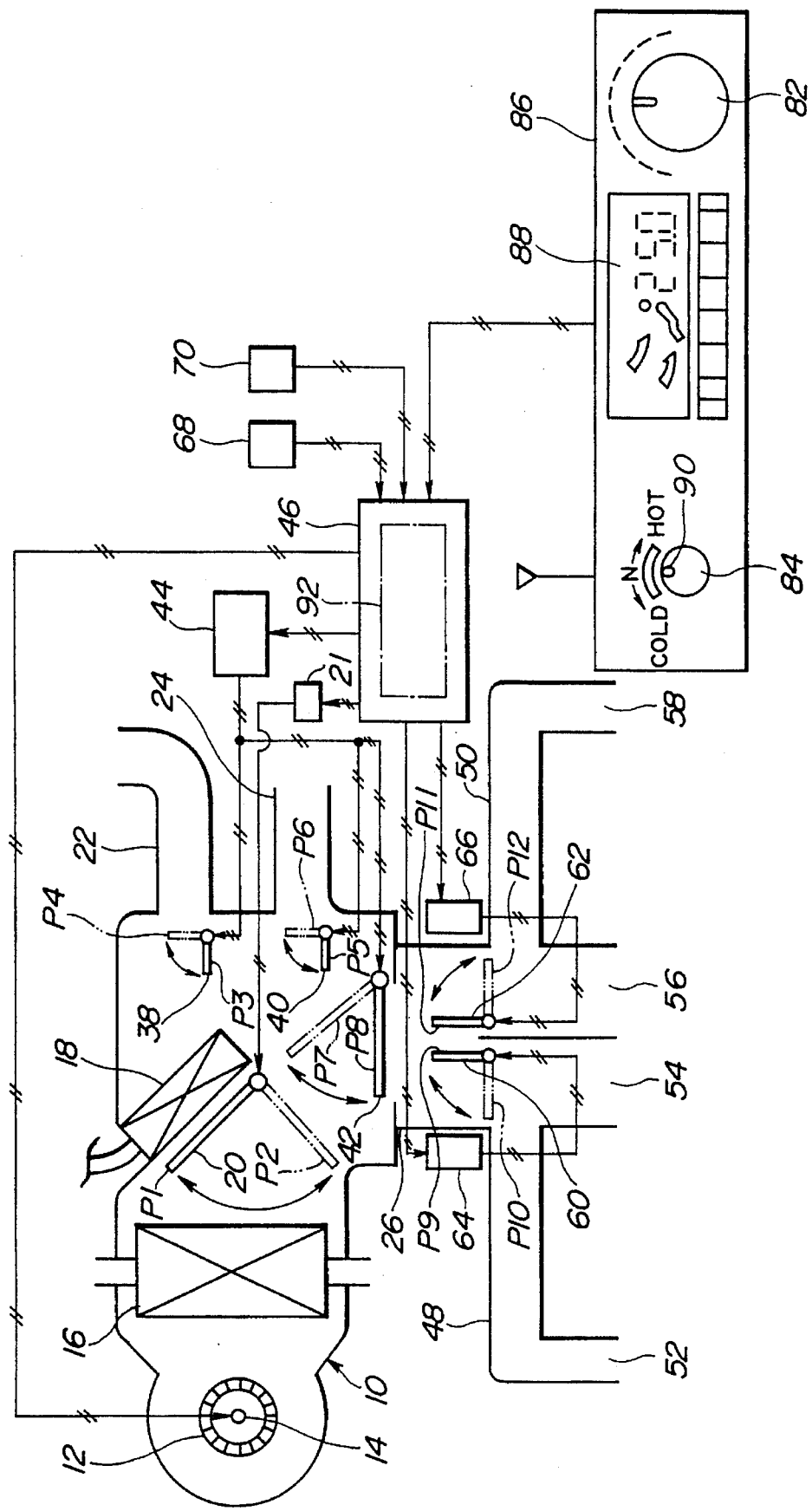
FIG. 1 is a schematic diagram of one preferred embodiment of an air conditioner system for a vehicle, according to the present invention, which includes two vent valves.

Referring now to FIG. 1, the preferred embodiment of an air conditioner system for a vehicle, according to the invention is described.

Figure 3:
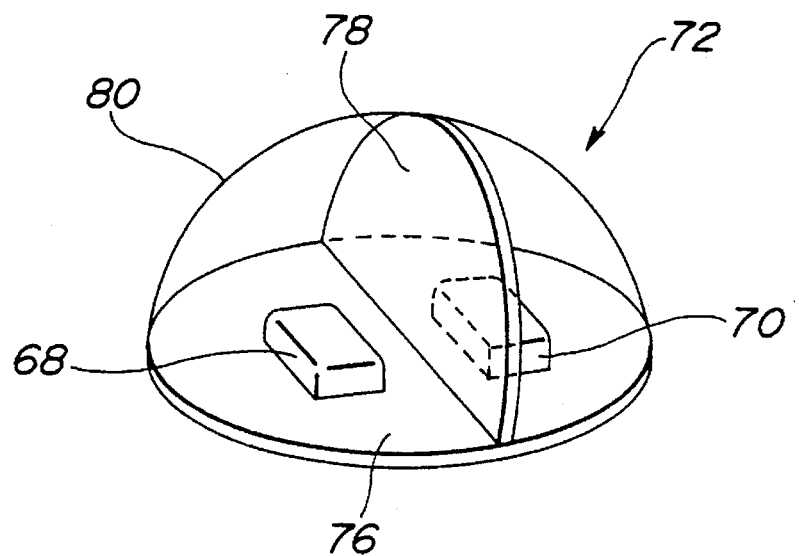
FIG. 3 is an enlarged perspective view of the insolation sensor unit.

As illustrated in FIG. 1, the air conditioner system comprises an air duct 10 adapted to conduct a conditioned air. Disposed within the air duct 10 are a blower fan 12 driven by a motor 14, an evaporator 16 for cooling air fed by the blower fan 12 and a heater core 18 for heating the air passing through the evaporator 16. An air mixing valve 20 is disposed before the heater core 18 and movable between two positions P1 and P2 indicated by solid and phantom lines in FIG. 1. The air duct 10 includes a defroster duct 22, a foot duct 24 and a vent duct 26 defining air passages opening to an occupant compartment 28 of the vehicle 30 as shown in FIG. 3. The occupant compartment 28 includes a driver's occupying area 32 and a front passenger's occupying area 34. The conditioned air passes via the defroster duct 22, the foot duct 24 and the vent duct 26 to a front window 36, foot parts and chest parts of the driver and front passenger, respectively.

A defroster valve 38, a foot valve 40 and a main vent valve 42, as illustrated in FIG. 1, are disposed within the corresponding air passages, respectively. The defroster valve 38, the foot valve 40 and the main vent valve 42 are in the form of door and movable between their fully opened positions P3, P5 and P7 and their fully closed positions P4, P6 and P8, respectively. By changing the positions of these valves 38, 40 and 42, the air conditioner system operates in various operation modes including a defroster (DEF) mode, a FOOT mode, a VENT mode, and a bilevel (B/L) mode. In the DEF mode, the defroster valve 38 is open and the foot valve 40 and the main vent valve 42 are closed so that air flows into the defroster duct 22. In the FOOT mode, the foot valve 40 is open and the defroster valve 38 and the main vent valve 42 are closed, so that air flows into the foot duct 24. In the VENT mode, the main vent valve 42 is open and the defroster valve 38 and the foot valve 40 are closed, so that air flows into the vent duct 26. In the B/L mode, the foot valve 40 and the main vent valve 42 are open, so that air flows into both the foot duct 24 and the vent duct 26. The defroster valve 38, the foot valve 40 and tile main vent valve 42 are referred to as mode valves hereinafter. These mode valves 38, 40 and 42 are operatively connected with a mode valve actuator 44 connected to a control unit 46.

As illustrated in FIG. 1, the vent duct 26 includes first and second vent duct portions 48 and 50 having two pairs of outlets 52, 54 and 56, 58. Thus, the vent duct 26 defines a first passage opening to a driver's occupying area 32 and a second passage opening to a front passenger's occupying area 34 of the occupant compartment 28. A first vent valve 60 is disposed within the first passage and a second vent valve 62 is disposed within the second passage. The first vent valve 60 and the second vent valve 62 are in the form of door and movable between fully opened positions P9 and P11 and fully closed positions P10 and P12 as indicated in FIG. 1, respectively. A flow rate of the conditioned air flowing into each of the driver's and front passenger's occupying areas 32 and 34 varies depending upon the position, viz. degree of opening, of each of the first and second vent valves 60 and 62. A first actuator 64 is drivingly connected to the first vent valve 60 and a second actuator 66 is drivingly connected to the second vent valve 62. The first and second actuators 64 and 66 are of a stepless continuously variable type which operates continuously and steplessly each of the first and second vent valves 60 and 62 to shift to a desirable position thereof. The air mixing valve actuator 21 is also of this type. The first and second actuators 64 and 66 are connected to the control unit 46.

Figure 2:
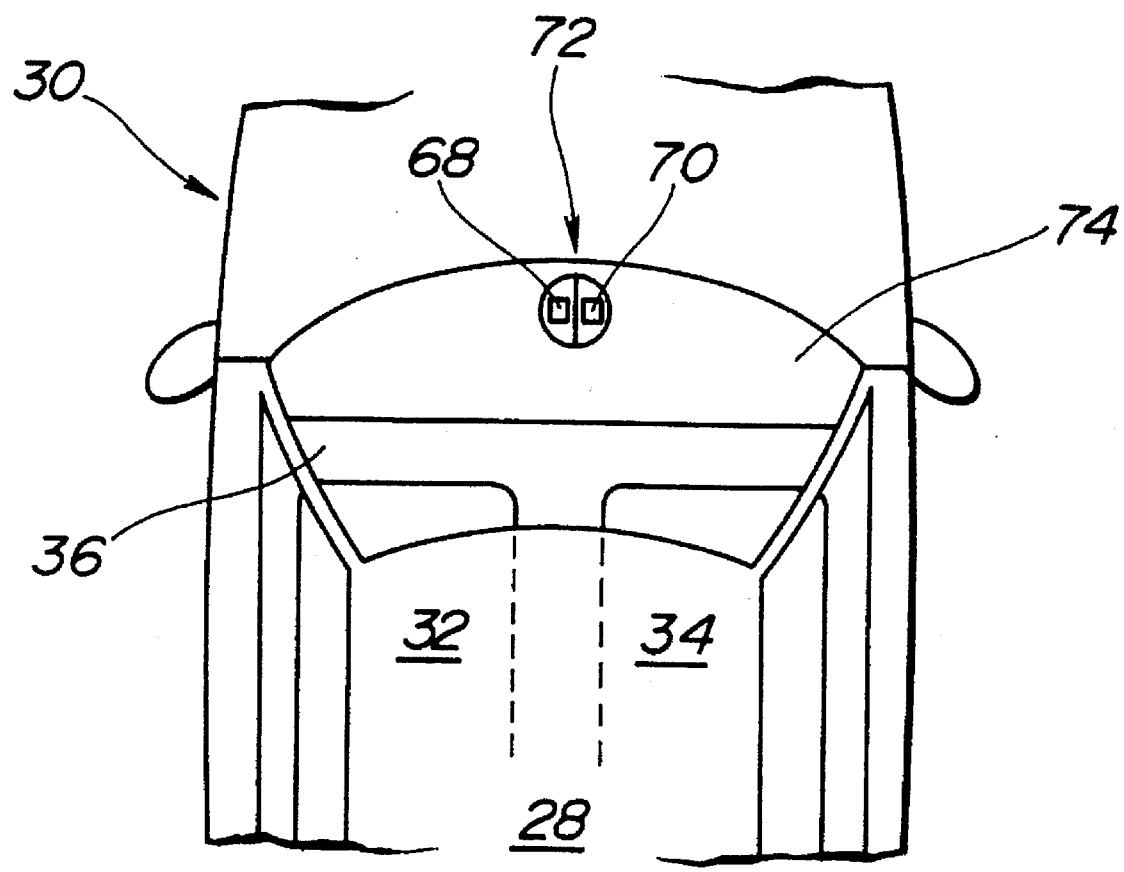
FIG. 2 is a fragmentary top plan view of the vehicle equipped with an insolation sensor unit.
Figure 4:
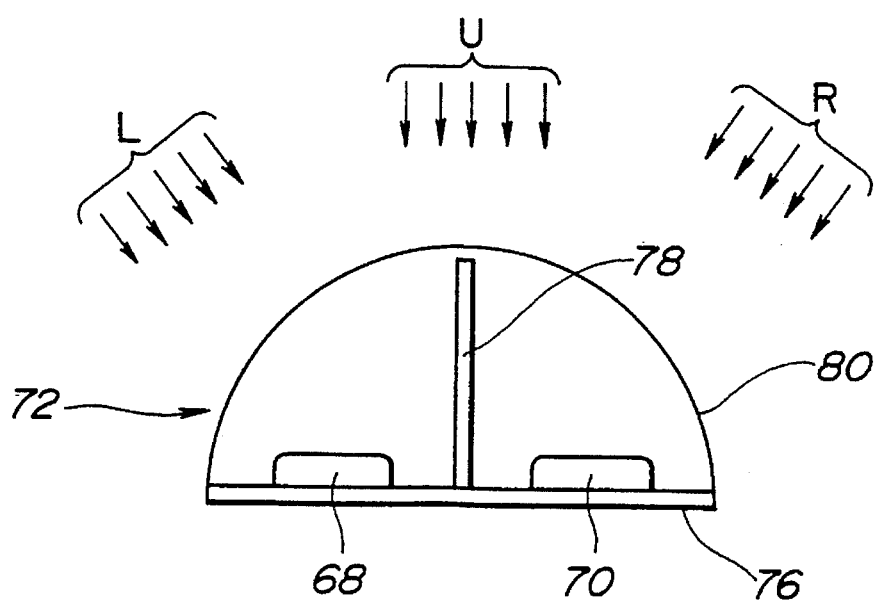
FIG. 4 is a sectional view of FIG. 3, showing sun light falling onto the insolation sensor unit.

First and second sensors 68 and 70 are connected to the control unit 46. The first sensor 68 is so constructed and arranged as to detect insolation magnitude within the driver's occupying area 32 and generate a first sensor signal QSUN-D indicative of the detected insolation magnitude within the driver's occupying area 32. The second sensor 70 is so constructed and arranged as to detect insolation magnitude of the front passenger's occupying area 34 and generate a second sensor signal QSUN-A indicative of the insolation magnitude within the front passenger's occupying area 34. The first and second sensors 68 and 70 form a sensor unit 72 as illustrated in FIGS. 3 and 4. The sensor unit 72 is secured to a mid-portion of a top surface of an instrument panel 74 as illustrated in FIG. 2. The sensor unit 72 includes a circular base plate 76 to which the first and second sensors 68 and 70 are secured. The base plate 76 is divided into two portions, specifically left and right portions as viewed in FIG. 3, by a generally semicircular partition wall 78 as seen from FIG. 3. The first and second sensors 68 and 70 are disposed on the left and right portions of the base plate 76, respectively, and enclosed together with the partition wall 78 in a semi-spherical transparent cover 80 as illustrated in FIG. 3. When incident sun light falls in a direction as indicated by arrows U in FIG. 4, the first and second sensors 68 and 70 detect equivalent insolation magnitudes in the separate portions owing to no shut-off of the incident sun light by the partition wall 78. As a result, identical first and second sensor signals QSUN-D and QSUN-A are generated from the first and second sensors 68 and 70. When the incident sun light falls in directions as indicated by arrows L and R, respectively, in FIG. 4, a part of the incident sun light is shut off by the partition wall 78 and therefore the first and second sensors 68 and 70 detect the insolation magnitudes QSUN-D and QSUN-A of different values. Then, the first and second sensor signals indicative of the insolation magnitudes QSUN-D and QSUN-A of the different values are generated from the first and second sensors 68 and 70.

Referring back to FIG. 1, various switches including a temperature setting dial 82 and a control dial 84 manually operable by the front passenger are arranged on a control panel 86 and connected to the control unit 46. In FIG. 1, the reference numeral 88 denotes a display panel indicating the current operation mode of the air conditioner system and the current temperature set. The control dial 84 has a mark 90 indicative of a manually set position and is rotatable in opposite directions HOT and COLD with respect to a reference neutral position N. When the control dial 84 is rotated in the directions HOT and COLD, an output signal indicative of a manual operable amount Δdial of the control dial 84 from the reference neutral position N is generated.

The control unit 46 is of the microcomputer based control module including as usual a central processor unit (CPU), a read only memory (ROM), a random access memory (RAM), an input interface and an output interface. The control unit 46 recognizes operating conditions of the air conditioner system by reading output signals from ambient temperature sensor and room temperature sensor (not shown) which are connected to the control unit 46. Depending upon the operating conditions recognized, the control unit 46 generates output signals to be supplied to the blower fan motor 14, the air mixing valve actuator 21 and the mode valve actuator 44 for controlling the blower fan 12, the air mixing valve 20 and the mode valves 38, 40 and 42, respectively. The control unit 46 also determines target degrees of opening Xd and Xa which the first and second vent valves 60 and 62 are to take in response to the first and second sensor signals, and provides first and second outputs to the first and second actuators 64 and 66, respectively, to set the first and second vent valves 60 and 62 at the determined target degrees of opening Xd and Xa.

Figure 5:
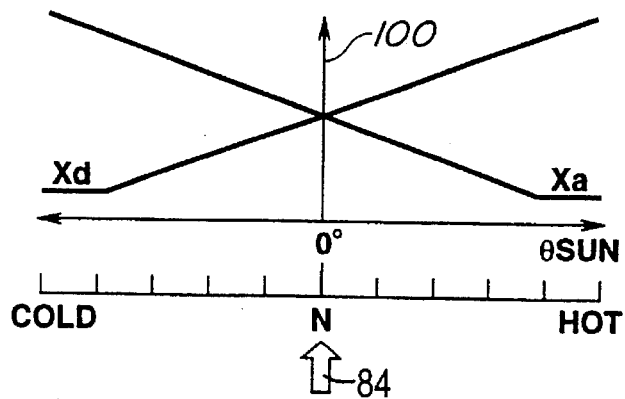
FIGS. 5–7 are explanatory diagrams of determining target degrees of opening for the vent valves.
Figure 6:
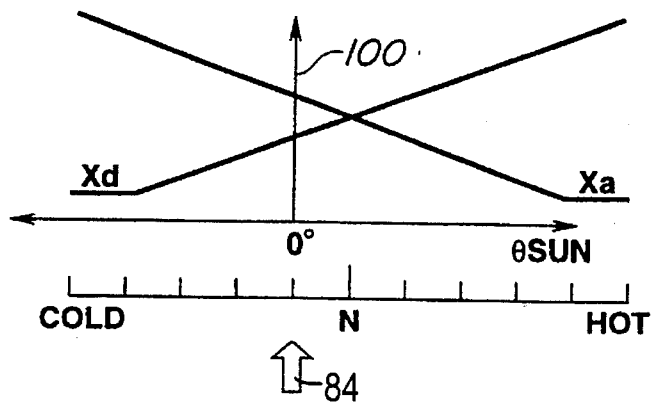
Figure 7:
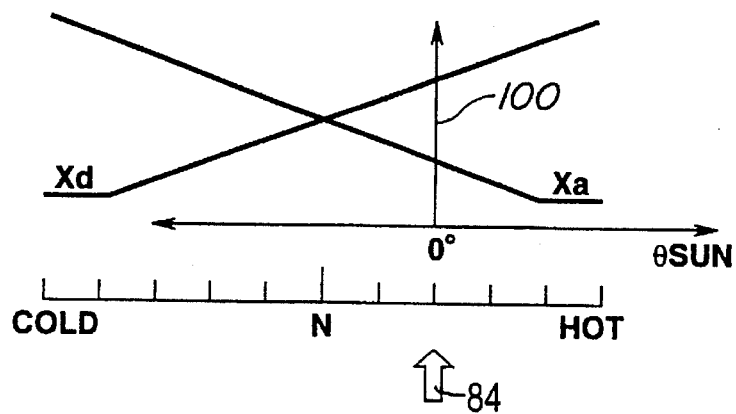

FIGS. 5-7 are now explained for easy understanding of a control strategy. In each of FIGS. 5-7, there is shown a relation between the position of the control dial 84 and the target degrees of opening Xd and Xa for the first and second vent valves 60 and 62. The target degrees of opening Xd and Xa are determined based on a sun light incident angle θSUN. The sun light incident angle θSUN is determined on the basis of a difference between the first and second sensor signals, as explained later. The target degrees of opening Xd and Xa are indicated as valve opening rate. A blank arrow denotes a position at which the mark 90 of the control dial 84 is placed. The blank arrow is movable between COLD and HOT positions of a scale provided on the control panel 86 through which the control dial 84 is mounted. In the upper graphic portion of each of FIGS. 5-7, a ruler 100 is provided for correcting the target degrees of opening Xd and Xa by the manually set amount of the control dial 84. The ruler 100 shifts together with the blank arrow when the control dial 84 is manually operated.

As illustrated in FIG. 5, at the sun light incident angle θSUN of zero degree, the target degree of opening Xd is equal to the target degree of opening Xa. At the sun light incident angle θSUN>0, the target degree of opening Xd is greater than the target degree of opening Xa. At the sun light incident angle θSUN<0, the target degree of opening Xd is smaller than the target degree of opening Xa. As seen from FIG. 5, a difference between the target degrees of opening Xd and Xa increases as a deviation of the determined sun light incident angle θSUN from a reference sun light incident angle, viz. zero degree, increases. As shown in FIG. 5, when the control dial 84 is operated to set the blank arrow at the reference neutral position N, the ruler 100 is placed at the corresponding position thereto. As illustrated in FIG. 6, when the control dial 84 is operated to move the blank arrow from the reference neutral position N toward the COLD by one scale mark, the. ruler 100 also shifts toward the COLD by the one scale mark. As shown in FIG. 7, when the control dial 84 is operated to move the blank arrow from the reference neutral position N toward the HOT by two scale marks, the ruler 100 also shifts toward the HOT by the two scale marks. Thus, the target degrees of opening Xd and Xa determined based on the sun light incident angle θSUN are correctable by the manually operable amount of the control dial 84.

The control unit 46 include a memory 92, as shown in FIG. 1, storing a control routine implementing the control strategy. The control routine will now be specifically explained with the flow diagram shown in FIG. 8, which includes the steps S1-S12.

As illustrated in FIG. 8, at a step S1, there is an interrogation whether or not the air conditioner system is operating in the VENT mode or the B/L mode. If the interrogation at the step S1 results in negative, the control routine proceeds to a step S2. At the step S2, the target degrees of opening Xd and Xa for the first and second vent valves 60 and 62 are set to 100%, respectively. The control routine proceeds to a step S12. At the step S12, a routine to drive the first and second actuators 64 and 66 to set the first and second vent valves 60 and 62 at the target degrees of opening Xd and Xa, respectively, is carried out. Then, the control routine returns to the start.

If the interrogation at the step S1 results in affirmative, the control routine proceeds to a step S3. At the step S3, there is an interrogation whether or not a voltage applied to the blower fan 14 is less than a predetermined value V0. If the interrogation at the step S3 results in negative, the control routine in turn proceeds to the steps S2 and S12 and returns to the start.

If the interrogation at the step S3 results in affirmative, the control routine proceeds to a step S4. At the step S4, there is an interrogation whether or not an average value QAVE of the insolation magnitudes QSUN-D and QSUN-A detected by the first and second sensors 68 and 70 is greater than a predetermined value Q0. If the interrogation at the step S4 results in negative, the control routine proceeds to the steps S2 and S12 and then returns to the start.

If the interrogation at the step S4 results in affirmative, the control routine proceeds to a step S5. At the step S5, a difference $\Delta$QSUN between the insolation magnitudes QSUN-D and QSUN-A is calculated. Subsequently, the control routine proceeds to a step S6. At the step S6, the sun light incident angle $\theta$SUN is determined based on the calculated difference $\Delta$QSUN. The sun light incident angle $\theta$SUN is zero when no calculated difference $\Delta$QSUN exists, and varies in proportion to the calculated difference $\Delta$QSUN. Then, the control routine proceeds to a step S7. At the step S7, there is an interrogation whether or not a manually operating amount $\Delta$dial is set by moving the control dial 84 from the reference neutral position N.

If the interrogation at the step S7 results in affirmative, the control routine proceeds to a step S11. At the step S11, gains K2 and K4 are set by the following equations (1) and (2):

$$K2=b0 \quad (1)$$

$$K4=b1 \quad (2)$$

wherein b0 and b1 indicate constants. Subsequently, the control routine proceeds to a step S10. At the step S10, the target degrees of opening Xd and Xa for the first and second vent valves 60 and 62 are determined by calculating the following equations (3) and (4):

$$Xa=K1\theta SUN+K2 \quad (3)$$

$$Xd=K3\theta SUN+k4 \quad (4)$$

wherein K1 and K3 indicates gains. The control routine proceeds to the step 12 at which a driving operation of the first and second actuators 64 and 66 is performed to set the first and second valves 60 and 62 at the target degrees of opening Xd and Xa determined at the step S10. Then, the control routine returns to the start.

If the interrogation at the step S7 results in negative, the control routine proceeds to a step S8. At the step S8, the manually operating amount $\Delta$dial of the control dial 84 is obtained. Then, the control routine proceeds to a step S9. At the step S9, the gains K2 and K4 are determined based on the manually operating amount $\Delta$dial by using the following equations (5) and (6):

$$K2=a0.\Delta dial+b0 \quad (5)$$

$$K4=a1.\Delta dial+b1 \quad (6)$$

wherein a0 and a1 indicate constants. The control routine proceeds to the step S10. At the step S10, the target degrees of opening Xa and Xd are determined by calculating the aforementioned equations (3) and (4) based on the determined sun light incident angle $\theta$SUN and the obtained manually operating amount $\Delta$dial. Subsequent to the step S10, the control routine proceeds to the step S12 and returns to the start.

As is appreciated from the above description, the air conditioner system according to the present invention performs variable air condition control in the driver's occupying area 32 and the front passenger's occupying area 34 of the occupant compartment 28 depending upon the insolation magnitudes within the driver's occupying area 32 and the front passenger's occupying area 34. The air conditioner system is also capable of variably controlling air condition in the driver's occupying area 32 and front passenger's occupying area 34 depending upon a manually operable amount of the control dial 84.

The structure and arrangement of the first and second insolation sensors is not limited to the structure and arrangement shown in the aforementioned embodiment.

A manually operative control member of push-button or slider type may be substituted for the control dial 84.

What is claimed is:

1. In a vehicle including an occupant compartment including a driver's occupying area and a front passenger's occupying area, an air conditioner system comprising:

a duct adapted to conduct a conditioned air, said duct defining a first passage opening to the driver's occupying area and a second passage opening to the front passenger's occupying area;

a first vent valve disposed within said first passage;

a second vent valve disposed within said second passage;

a first actuator drivingly connected to said first vent valve;

a second actuator drivingly connected to said second vent valve;

a first sensor so constructed and arranged as to detect insolation magnitude within the driver's occupying area and generate a first sensor signal indicative of said detected insolation magnitude within the driver's occupying area;

a second sensor so constructed and arranged as to detect insolation magnitude within the front passenger's occupying area and generate a second sensor signal indicative of said detected insolation magnitude within the front passenger's occupying area; and means for determining target degrees of opening which said first and second vent valves are to take in response to said first and second sensor signals and providing first and second outputs to said first and second actuators, respectively, to set said first and second vent valves at said determined target degrees of opening, respectively;

wherein said means includes a memory storing a control routine, said control routine including the steps of calculating a difference between said first and second sensor signals, determining a sun light incident angle based on said calculated difference, obtaining a manually operable amount, and calculating predetermined equations based on said determined sun light incident angle and said manually operable amount to provide said determined target degrees of opening.

2. The combination as claimed in claim 1, wherein a difference between said determined target degrees of opening increases as a deviation of said determined sun light incident angle from a reference sun light incident angle increases.

* * * * *